United States Patent [19]

Lucas et al.

[11] Patent Number: 5,025,078
[45] Date of Patent: Jun. 18, 1991

[54] EPOXY RESIN SYSTEMS CONTAINING METHYL-2,6,-CYCLOHEXANEDIAMINE

[75] Inventors: Peter A. Lucas, Allentown; Jeremiah P. Casey, Emmaus, both of Pa.

[73] Assignee: Air Products and Chemicals, Inc., Allentown, Pa.

[21] Appl. No.: 475,470

[22] Filed: Feb. 2, 1990

[51] Int. Cl.$^5$ ............................................. C08G 59/50
[52] U.S. Cl. .................................. 528/120; 528/122; 528/297; 525/523
[58] Field of Search ............... 525/523; 528/120, 122, 528/297

[56] References Cited

U.S. PATENT DOCUMENTS

| | | | |
|---|---|---|---|
| 2,817,644 | 12/1957 | Shokal et al. | 528/122 |
| 3,321,438 | 5/1967 | Booker et al. | 260/47 |
| 3,629,181 | 1/1971 | Basel | 260/31.8 E |
| 3,631,125 | 12/1971 | Salensky | 528/124 |
| 3,741,928 | 6/1973 | Salensky | 523/466 |
| 3,914,307 | 10/1975 | Massie | 564/451 |
| 4,447,586 | 5/1984 | Shimp | 525/504 |

*Primary Examiner*—John C. Bleutge
*Assistant Examiner*—Robert E. L. Sellers, II
*Attorney, Agent, or Firm*—Russell L. Brewer; James C. Simmons; William F. Marsh

[57] ABSTRACT

This invention relates to polyepoxide resins cured with an amine composition containing 1-methyl-2,6-cyclohexanediamine. The resulting polyepoxide resins generally are more easily processable and have improved thermal stability, greater elongation and enhanced fracture toughness.

7 Claims, 2 Drawing Sheets

EPOXY RESIN SYSTEMS CONTAINING METHYL-2,6,-CYCLOHEXANEDIAMINE

TECHNICAL FIELD

This invention pertains to polyepoxide resins cured with 1-methyl-2,6-cyclohexanediamine.

BACKGROUND OF THE INVENTION

Epoxy resins are widely known and used primarily as surface-coating materials because of their toughness, flexibility, adhesion and chemical resistance. They can be used for molding and laminating to produce glass fiber-reinforced articles. Use of epoxy resins in casting, potting and encapsulation in the electrical and tooling industries is also known.

Epoxy resins are fundamentally polyethers and are typically prepared by condensing epichlorohydrin with an aromatic diol such as bisphenol A. The epoxy resins then are cured by reaction with a polyamine. Representative patents which describes various epoxy resins and amine curing agents are as follows:

U.S. Pat. No. 4,447,586 discloses polyepoxide resins cured with hindered aromatic amines with the cure being accelerated by the incorporation of metal fluoroborates. Hindered aromatic amines utilized in the cure include diethyltoluenediamine derivatives, e.g., 1-methyl-3,5-diethyl-2,4- and 2,6-diaminobenzene; methylene bis(2,6-diisopropylaniline), methylene bis(2,6-diethylaniline) and the like. The epoxide resins are reported as having excellent heat distortion temperature resistance and excellent resistance to water and steam.

U.S. Pat. No. 2,817,644 discloses various polyepoxide resin systems formed by reacting glycidyl polyethers of polyhydric phenols with a hydrogenated aromatic primary or secondary amine. The use of hydrogenated aromatic amines enhances processability in that the curing agents are liquid and they have little odor or toxicity. Unexpectedly high hot hardness, excellent resistance to solvents and water and good adhesion to metals are reported. Examples of aromatic polyamines which when hydrogenated form candidate curing agents include phenylenediamine isomers, N-methylphenylenediamine isomers. 2.4-diaminotoluene, 1,3-diamino-4-isopropylbenzene and the like.

U.S. Pat. No. 3,629,181 discloses the use of cycloaliphatic di-primary diamines as curing agents for epoxide resins formed by the reaction of a glycidyl ether with a polyhydric phenol. In the prior art section, the patentees pointed out that cycloaliphatic or cycloaliphatic-aliphatic polyamines had been utilized to cure epoxide resins, but surface faults such as orange peel and frosting occurred. Other problems with respect to solvent resistance and sweating were reported. Di-primary amines used in forming adducts for curing polyepoxide resins included cyclohexane and alkyl substituted cyclohexanes, such as 4-ethyl-1,2-diaminocyclohexane, 4,4'-diaminodicyclohexylmethane(PACM) and isophoronediamine.

U.S. Pat. No. 3,321,438 discloses polyepoxide resins suited for fluidized bed coating applications. The polyepoxide systems having vicinal epoxy equivalency are cured with aliphatic amines and piperazines under controlled conditions. Examples of amine curing agents include diethylenetriamine, dimethylamino- and diethylaminopropylamine, propylenediamine, triethylenetetramine; and cycloaliphatic diamines such as N-cyclohexyl-1,3-propane iamine and N-aminoethylpiperazine.

U.S. Pat. Nos. 3,631,125 and 3,741,928 disclose epoxide molding compositions containing metatoluenediamine. The examples show the use of 2,4-and 2,6-toluenediamine and mixtures as curatives for a diglycidylether of 2,2-bis(parahydroxyphenyl)propane epoxide resin.

SUMMARY OF THE INVENTION

This invention relates to epoxy resins cured with an amine curing agent wherein at least a portion of the amine curing agent is 1-methyl-2,6-cyclohexanediamine. Preferably, the amine curing agent represents a mixture of methylcyclohexanediamine isomers wherein from about 65 to 90 mole % of the methylcyclohexanediamine is 1-methyl-2,4-cyclohexanediamine and 10 to 35 mole % is 1-methyl-2,6-cyclohexanediamine.

Several advantages are associated with the epoxy resins of this invention, and these advantages include excellent physical properties such as thermal stability, elongation and fracture toughness which are attributable to the inclusion of the 1-methyl-2,6-cyclohexanediamine.

In addition, the epoxy resins are easy to formulate by virtue of the curing because the 1-methyl-2,6-cyclohexanediamine is a liquid and it unexpectedly imparts delayed reaction to the system thereby extending pot life.

DRAWINGS

DETAILED DESCRIPTION OF THE INVENTION

Figure 1:
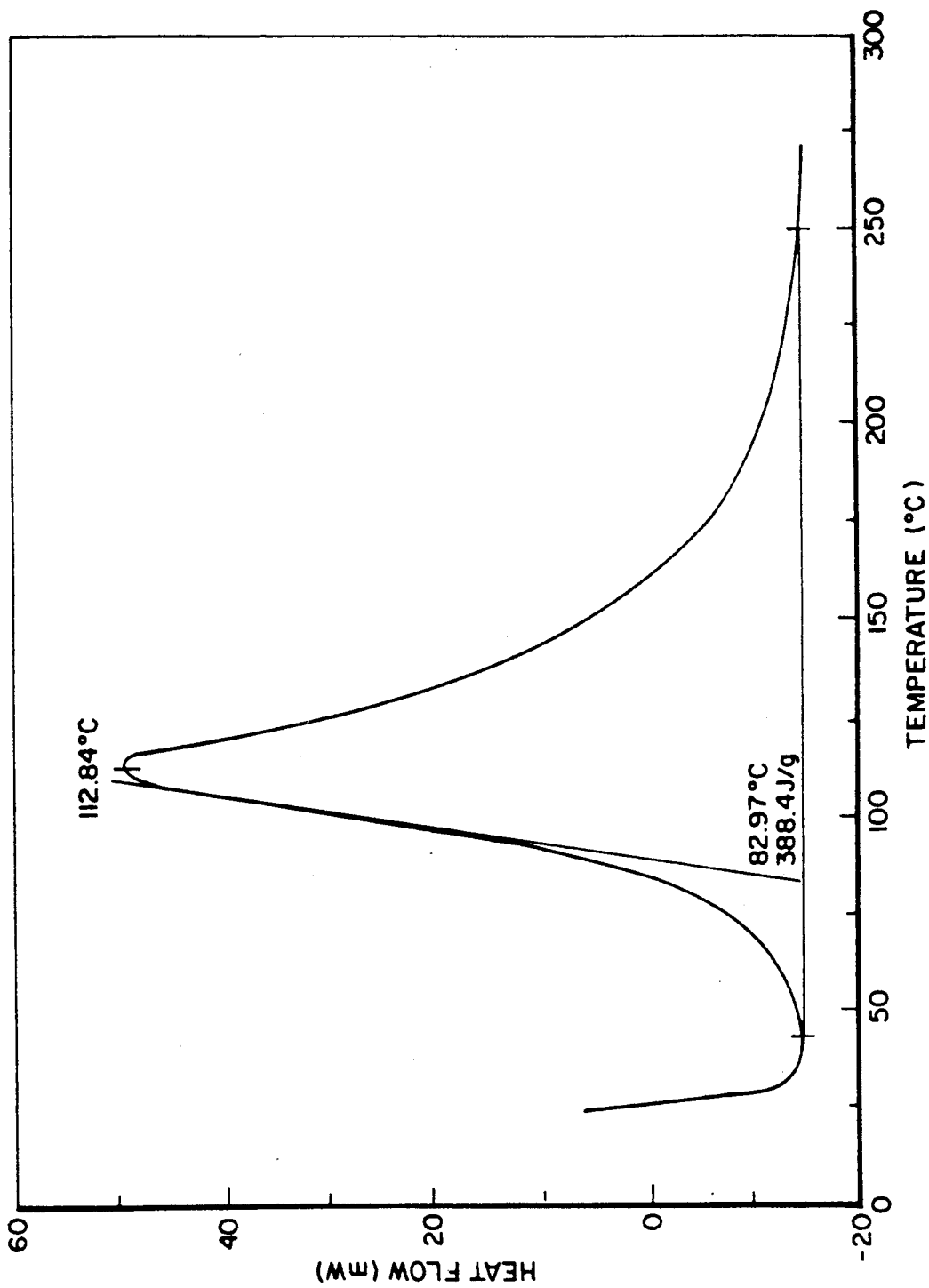
FIG. 1 is a differential scanning calorimeter plot for 1-methyl-2,4-cyclohexenediamine.

Epoxy resin forming systems used in preparing the polyepoxide resin are conventional which are typically based upon glycidyl polyethers, polyesters and glycidylamines. On reaction with hydrogenated aromatic amines they form the cured polyepoxide resins. Glycidyl ethers of polyhydric phenols typically are formed by reacting epichlorohydrin with polyhydric phenols such as bisphenol A and derivatives thereof. Glycidyl ethers of novolac resins, which are based upon the reaction of an aldehyde with a polyhydric phenol, are also suited. Other representative polyhydric phenols are resorcinol, hydroquinone, 4,4'-(dihydroxydiphenyl)methane, bis(2-hydroxynapthyl)methane, and bis(2-hydroxynapthyl)propane. The glycidyl polyester polyepoxides are based upon the reaction of epichlorohydrin with an aromatic or aliphatic polycarboxylic acid such as phthalic acid or adipic acid. The glycidyl amines formed by the reaction of epichlorohydrin and diamines or aminophenols can also be used as the polyepoxide reactant. Representative diamines that can be reacted with epichlorohydrin include methylenedianiline, bis(paraaminocyclohexy)methane(PACM) and paraaminophenol. Of the above polyepoxide resins, the epoxide resin which is based upon the reaction of epichlorohydrin and bisphenol A is preferred. The polyepoxide resins typically have epoxide equivalent value ranging from 0.1 to 2.5.

It has been found that the use of 1-methyl-2,6-cyclohexyldiamine when used a portion of the amine curing agent, enhances the resulting physical properties of the polyepoxide resin. Examples of amines which can be utilized in combination with 1-methyl-2,6-cyclohexanediamine include aliphatic amines such as diethylenetriamine, propylenediamine, ethylene diamine, triethylenetetramine, and cycloaliphatic amines such as N-cyclo-hexyl-1,3-propanediamine, and piperazine.

Aromatic amines hydrogenated to their saturated counterparts also can be used as curing agents in combination with 1-methyl-2,6-cyclohexanediamine. Such hydrogenated aromatic amines include 1-methyl-2,4-cyclohexanediamine, 1-methyl-3,5-diethyl- 2,4- and 2,6-cyclohexanediamine and hydrogenated meta and para phenylenediamine.

The amine curing agent for the polyepoxide resins can also be a mixture of cycloaliphatic and aromatic amines. Representative aromatic amines which can be used in that combination include 2,4- and 2,6-toluenediamine methylenedianiline, metaphenylenediamines, diethyltoluenediamine and so forth.

Preferably the level of 1-methyl-2,6-cyclohexanediamine, based upon the moles of diamine used as curing agent, is from about 5 to 50 mole % of the total amine quantity used in forming the polyepoxide resin. Preferably, in the above curative systems, a mixture of methylcyclohexanediamines is used where the mixture consists of 1-methyl-2,4-cyclohexanediamine and 1-methyl-2,6-cyclohexanediamine with the mole percent of 1-methyl-2,6-cyclohexanediamine ranging from about 10 to 35 mol % and from 65–90 mol % of the 1-methyl-2,4-cyclohexanediamine. The isomer mix of methylcyclohexanediamines is readily obtained by the hydrogenation of a mixture of 2,4- and 2,6-toluenediamine, the 80/20 mixture of 2,4-/2,6-toluenediamine providing a mixture of 2,4-/2,6-methylcyclohexanediamines in the range of 85–90% 2,4- and 10–15% of the 2,6- isomer.

The level of amine curing agent based upon the moles of polyepoxide resin is conventional and ranges from about 0.4 to 0.6 molar equivalents amine per equivalent epoxide group. Temperatures, pressures, and other conditions suited for curing epoxy systems are conventional and range from 0° to 200° C and from 5 to 150 psig.

The following examples are provided to illustrate various embodiments of the invention and not intended to restrict the scope thereof.

EXAMPLE 1

Preparation of 1-methyl-2.6-cyclohexanediamine (26MCHD)

Distilled 2,6-toluenediamine (TDA)(210.5 g) slurried in 550 ml HPLC grade tetrahydrofuran (THF) was charged to a 2L autoclave reactor. A catalyst consisting of 5% Rh/Al$_2$O$_3$ (Engelhard), in an amount of 10.08 g, corresponding to 5% by weight of the substrate to be hydrogenated, was added to the autoclave. The precious metal catalyst was base modified by addition of 0.15 g anhydrous LiOH (Fisher). The reactor was sealed, purged 3 times with N$_2$, pressure checked al 1100 psi, then purged 2 times with H$_{2z}$ before pressurization to 1000 psi H$_2$ pressure. Upon heating the stirred autoclave contents, H$_2$ was taken up; the consumption of H$_2$ equivalents to theory occurring in less than two hours at 150° C. The reactor was cooled after two hours, purged 3 times with N$_{2z}$ then opened for total contents removal. Ammonia presence confirmed hydrogenolysis had occurred resulting in byproduct 2-methylcyclohexylamine. The reaction mixture was filtered, stripped and fractionally distilled to remove the hydrogenolysis byproduct from the desired MCHD isomer.

EXAMPLE 2

Preparation of 1-methyl-2,4-cyclohexanediamine (24MCHD)

The procedure of Example 1 was essentially followed to produce the cyclohexane derivative. 2.4-TDA (245.3 g. Aldrich 98%. without isomer contamination) slurried in 550 ml HPLC grade THF was charged to a 2L autoclave. Catalyst added was 5% Ru/Al$_2$O$_3$ (Engelhard). 12.22 g, corresponding to 5% by weight of the substrate to be hydrogenated. The precious metal catalyst was base modified by addition of 0.18 g anhydrous LiOH. The reactor was sealed, purged 3 times with N$_2$, pressure checked at 1200 psi, then purged 2 times with Hz before pressurization to 1000 psi H$_2$ pressure. Upon heating the stirred autoclave contents H$_2$ was taken up, the consumption of Hz about 80% of theory occurring in 4.5 hours at 190° C. The reactor was cooled after two hours purged 3×with N$_2$, then opened for total contents removal. The reaction mixture was filtered, stripped and distilled to remove byproduct aminomethylcyclohexane, toluidines and unreacted 2,4-TDA from the desired MCHD isomer.

EXAMPLE 3

Preparation of Mixture of Methylcyclohexanediamine

Hydrogenation of a commercial 80/20 mole percent, 2,4-/2,6-TDA mixture containing the normal minor isomer contaminants was effected in accordance with the general procedure of Example 1. The hydrogenated isomer mixture was isolated and approximately 89 mole % of the mixture was the 24MCHD isomer and mole % was the 26MCHD isomer.

EXAMPLE 4

Gel and Exotherm Testing in Epoxy Resins

Gel and exotherm curative tests were carried out in conventional manner for the purpose of comparing conventional cycloaliphatic diamines against 1-methyl-2,6-cyclohexanediamine and two diamine mixtures, one containing 9 mol % (24MCHD) and 11 mol % 26MCHD and the other containing 65 mol % 24MCHD and 35 mol % 26MCHD. The epoxy resin utilized was a commercial liquid Bisphenol A sold by Dow Chemical under the designation DER 331 and was reacted in the normal 2:1 epoxy:diamine molar ratio. Tables 1 and 2 show gel times and cure exotherms. The term 1,2-DACH refers to 1,2-diaminocyclohexane; IPD refers to isophoronediamine; 24MCHD refers to 1-methyl-2,4-cyclohexanediamine from Example 2, 26MCHD refers to 1-methyl-2,6-cyclohexanediamine from Example 1. The expression 89/11 refers to the mixture of 24MCHD and 26MCHD in the respective mole percentages from Example 3. 65/35 refers to a mixture of 24MCHD and 26MCHD. in the respective mole percentages. The mixture was developed as a synthetic blend of isomers, i.e., the 89/11 isomer mixture was enriched with pure 26MCHD to represent the commercial limit of MCHD available from a commercial 65/35 2,4-/2,6-toluenediamine isomer mixture.

TABLE I

Gel times (minutes) were determined using a Sunshine Gel Meter:

|        | 1,2-DACH | IPD | 24MCHD | 89/11 24/26MCHD | 26MCHD |
|--------|----------|-----|--------|-----------------|--------|
| @ 25° C. | 211    | 200 | 256    | 297             | 304    |
| @ 60° C. | 27     | 29  | 34     | 40              | 44     |

The effect of inclusion of the more sterically hindered 2,6-MCHD isomer is seen in the gel times both at 25° C. and 60° C. This is an advantage where longer pot life is required for enhanced processability. Yet, these systems can be accelerated during cure using conventional formulating methods. Cure exotherms were measured by differential scanning calorimetry (DSC):

TABLE 2

|            | 1,2-DACH | IPD | 24MCHD | 65/35 24/26MCHD | 26MCHD  |
|------------|----------|-----|--------|-----------------|---------|
| Onset (°C.) | 82      | 76  | 83     | 85              | 84      |
| Peak (°C.)  | 110     | 110 | 113    | 116             | 116/162 |
| $\Delta H(J/g)$ | 377 | 376 | 388    | 403             | 374     |

Figure 2:
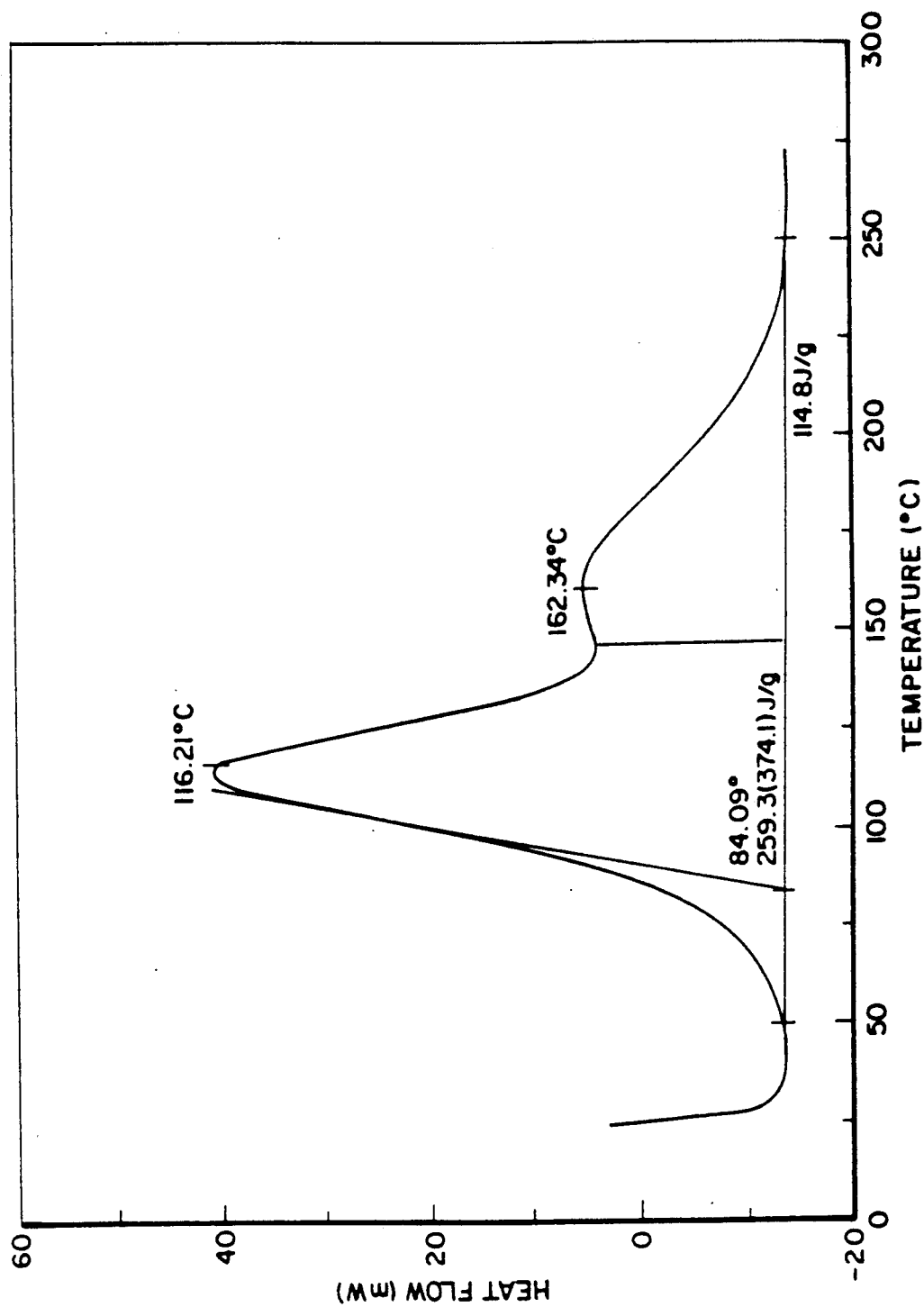
FIG. 2 is a differential scanning calorimeter plot for 1-methyl-2,6-cyclohexanediamine.

The first two column entries represent the commercial curatives 1,2-diaminocyclohexane and isophoronediamine. The isomer from 2,4-TDA hydrogenation, i.e., 24MCHD shows a faster cure than the 2,6-TDA hydrogenation product, and a distinctively different DSC profile. The slower reacting 26MCHD shows a second exotherm with a distinct second maximum at 162° C. Reference should be made to FIGS. 1 & 2 for the DSC plots.

EXAMPLE 5

Preparation of Epoxy Castings

One eighth inch castings were made from Dow DER 331 epoxy resin and amine curing agent. PACM sold by Air Products as Amicure® PACM, a liquid isomer mixture of methylenedicyclohexylamines, was used for comparison. The castings were cured at 80° C. for two hours, then at 150° C. for three hours. These castings were subjected to physical property testing following ASTM protocols.

Physical Properties—Table 3

On full review, three trends distinguish the mixture containing 26 MCHD vis-a-vis other diamine curative systems. The 2.6- and high percentage 2,6-materials give higher thermal stability reference being made to Tg, higher elongation and greater fracture toughness than do the 24MCHD systems.

The 2,6-isomer has a dual reaction mechanism which is seen in the FIG. 2 DSC scan. This dual reaction mechanism may explain the higher tensile elongation and fracture toughness in the cured castings. For comparison the 2,4 isomer DSC scan is seen in FIG. 1.

The distinct advantage seen for inclusion of the 26MCHD isomer in the fracture toughness test is that incorporation of the slower reacting, more synmetric isomer increases fracture toughness.

TABLE 4

Chemical Resistance of Cured Castings
Cure: 2 hrs. @ 80° C.
+3 hrs. @ 150° C.
% Weight Gain (Loss) After 120 Day Immersion @ 22° C.

| SOLUTION  | 1,2-DACH | 24MCHD    | 24/26MCHD 89/11 | PACM  |
|-----------|----------|-----------|-----------------|-------|
| Jet Fuel C | (0.04)  | 0.12      | 0.10            | 0.14  |
| Toluene   | 2.01     | 0.51      | 0.69            | 0.66  |
| Acetone   | Fractured | Fractured | 19.75          | 8.51  |
| Ethanol   | 9.51     | 1.95      | 1.93            | 1.20  |
| NH$_4$OH 10% | 1.10  | 9.62      | 4.94            | 4.20  |
| HNO$_3$ 10%  | 7.76  | 10.52     | 3.86            | 7.42  |
| HAc, 25%  | 15.79    | Fractured | 9.01            | 16.60 |

TABLE 3

Physical Properties of Cured Castings @ 22° C.
Cure: 2 hrs. @ 80° C.
+3 hrs. @ 150° C.

|  | 1,2 DACH | IPD | 24 MCHD | MCHD ISOMERS 24/26 (89/11) | 24/26 (65/35) | 26 MCHD | PACM |
|---|---|---|---|---|---|---|---|
| Glass Transition Temp., Tg Via DSC$^1$,°C. | 160 | 153 | 163 | 163 | 165 | 166 | 157 |
| Flexural Strength, psi | 28272 | 20800 | 24320 | 25150 | 23110 | 22730 | 23900 |
| Modulus, psi × 10$^5$ | 5.70 | 4.80 | 4.81 | 5.22 | 4.72 | 4.81 | 5.11 |
| Tensile Strength, psi | 8900* | 9600* | 9919 | 10550 | 11750 | 10360 | 10400* |
| Modulus, psi × 10$^5$ | 3.59* | 3.82* | 4.07 | 4.94 | 4.32 | 4.05 | 3.25* |
| % Elongation | 3.08* | 4.39* | 5.70 | 3.89 | 7.60 | 6.40 | 5.47* |
| Fracture Toughness$^2$, G$_1$C, KJ/M$^2$ | 0.155 | 0.154 | 0.141 | 0.122 | 0.160 | 0.191 | 0.297 |

*Cure Schedule: 2 hrs. @ 80
+2 hrs. @ 150
+2 hrs. @ 200
[1] Differential Scanning Calorimeter
[2] Compact Tension Test TABLE 4-continued

| | Chemical Resistance of Cured Castings Cure: 2 hrs. @ 80° C. +3 hrs. @ 150° C. % Weight Gain (Loss) After 120 Day Immersion @ 22° C. | | | |
|---|---|---|---|---|
| SOLUTION | 1,2-DACH | 24MCHD | 24/26MCHD 89/11 | PACM |
| DI H$_2$O | 0.98 | 1.53 | 1.96 | 1.97 |

Chemical Resistance—Table 4

The combination of the 24/26MCHD isomer mixture shows an advantage in resistance to various solvents and acid as compared to 24MCHD and 1,2-DACH.

What is claimed is:

1. In a polyepoxide resin composition comprising a glycidyl ether of a polyhydric phenol, glycidyl polyester or glycidyl amine cured with an amine curing agent, the improvement which comprises utilizing as said curing agent, or component thereof, 1-methyl-2,6-cyclohexanediamine.

2. The polyepoxide resin composition of claim 1 wherein the amine curing agent is a mixture of 1-methyl-2,4-cyclohexyldiamine and 1-methyl-2,6-cyclohexane- diamine and the mole percent of 1-methyl-2,4-cyclohexanediamine is from 65-90% and the mole percent of 1-methyl-2,6-cyclohexanediamine is from 10 to 35%.

3. The polyepoxide resin of claim 2 wherein the polyepoxide resin is formed from a glycidyl ether of a polyhydric alcohol.

4. The polyepoxide resin of claim 3 wherein the glycidyl ether of a polyhydric alcohol is the reaction product of epichlorohydrin and 4,4'-(dihydroxydiphenyl)propane.

5. The polyepoxide resin of claim 4 wherein the mole percent of 1-methyl-2,4-cyclohexanediamine is about 85-90% and the mole percent of 1-methyl-2,6-cyclohexanediamine is about 10-15% in the amine curing agent.

6. The polyepoxide resin of claim 5 wherein the molar equivalents of amine curing agent to polyepoxides resin is from 0.4 to 0.6:1.

7. The polyepoxide resin of claim 2 wherein the polyepoxide resin comprises a glycidyl amine and the glycidyl amine is a glycidyl derivative of methylenedianiline, paraaminophenol, or bis(paraaminocyclohexyl)methane.

* * * * *